United States Patent
Lin et al.

(10) Patent No.: US 7,515,794 B1
(45) Date of Patent: Apr. 7, 2009

(54) PERIODICALLY POLED ELEMENT HAVING A SUPPRESSING STRUCTURE FOR THE DOMAIN SPREADING

(75) Inventors: Tze Chia Lin, Hsinchu (TW); Tasi Hau Hong, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 27 days.

(21) Appl. No.: 11/942,165

(22) Filed: Nov. 19, 2007

(51) Int. Cl.
  *G02B 6/126* (2006.01)
  *G02B 6/26* (2006.01)
  *G02F 1/05* (2006.01)
(52) U.S. Cl. .............................. 385/40; 359/245; 385/14
(58) Field of Classification Search .................. None
  See application file for complete search history.

(56) References Cited

U.S. PATENT DOCUMENTS

| | | | |
|---|---|---|---|
| 5,193,023 A * | 3/1993 | Yamada et al. .............. 359/245 |
| 5,652,674 A * | 7/1997 | Mizuuchi et al. ............ 359/326 |
| 6,002,515 A | 12/1999 | Mizuuchi et al. |
| 6,353,495 B1 | 3/2002 | Mizuuchi et al. |
| 2008/0044153 A1* | 2/2008 | Ho et al. ...................... 385/147 |

* cited by examiner

*Primary Examiner*—Omar Rojas
(74) *Attorney, Agent, or Firm*—WPAT, P.C.; Anthony King

(57) ABSTRACT

A periodically poled element comprises a ferroelectric substrate having a top surface, a bottom surface, a top electrode structure including at least one conductor positioned on the top surface, and a suppressing structure including at least one insulator positioned on the top surface and a gap separating the insulator from the conductor. The ferroelectric substrate has a predetermined polarization direction, the conductor is configured to form an inverted domain with an inverted polarization direction in the ferroelectric substrate as a predetermined voltage is applied during a poling process, and the suppressing structure is configured to suppress the spreading of the inverted domain during the poling process.

18 Claims, 7 Drawing Sheets

PERIODICALLY POLED ELEMENT HAVING A SUPPRESSING STRUCTURE FOR THE
DOMAIN SPREADING

BACKGROUND OF THE INVENTION (A) Field of the Invention

The present invention relates to a periodically poled element, and more particularly, to a periodically poled element having a suppressing structure including insulators to suppress the spreading of the inverted domain during the poling process.

(B) Description of the Related Art

Poled structures having poled domains in a ferroelectric single crystal such as lithium niobate ($LiNbO_3$), lithium tantalite ($LiTaO_3$) and potassium titanyl phosphate ($KTiOPO_4$) are widely used in optical fields such as optical communications, optical storage and optical measurement. There are several methods for preparing the poled structure such as the proton-exchanging method, the electron beam-scanning method, the electric voltage application method, etc.

U.S. Pat. No. 6,002,515 discloses a method for manufacturing a polarization inversion part on a ferroelectric crystal substrate. The polarization inversion part is prepared by the steps of applying a voltage in the polarization direction of the ferroelectric crystal substrate to form a polarization inversion part, conducting a heat treatment to reduce the internal electric field generated in the substrate by the voltage applied, and then reinverting polarization in a part of the polarization inversion part by applying a reverse direction voltage against the voltage that was previously applied. In other words, the method for preparing a polarization inversion part disclosed in U.S. Pat. No. 6,002,515 requires applying electric voltage twice.

U.S. Pat. No. 6,353,495 discloses a method for forming an optical waveguide element. The method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

However, it becomes very difficult to uniformly control the width of the inverted domain in the ferroelectric substrate as the period of the inverted domain becomes shorter and shorter.

SUMMARY OF THE INVENTION

One aspect of the present invention provides a periodically poled element having a suppressing structure including insulators to suppress the spreading of the inverted domain during the poling process.

A periodically poled element according to this aspect of the present invention comprises a ferroelectric substrate having a top surface and a bottom surface, a top electrode structure including at least one conductor positioned on the top surface, and a suppressing structure including at least one insulator positioned on the top surface and a gap separating the insulator from the conductor. The ferroelectric substrate has a predetermined polarization direction, the conductor is configured to form an inverted domain with an inverted polarization direction in the ferroelectric substrate as a predetermined voltage is applied during a poling process, and the suppressing structure is configured to suppress the spreading of the inverted domain during the poling process.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
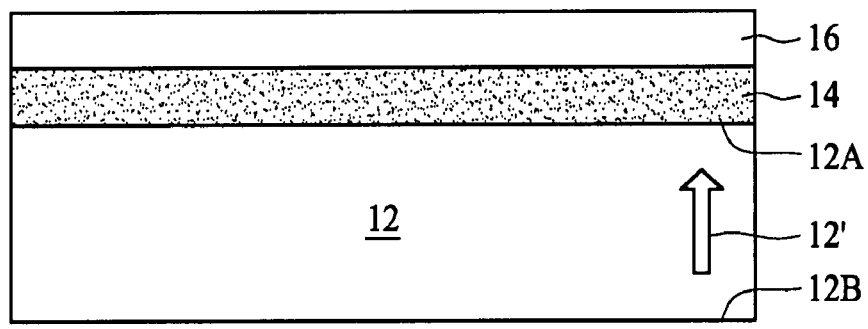
FIG. 1 to FIG. 6 illustrate a method for preparing a periodically poled element according to one embodiment of the present invention.
Figure 2:
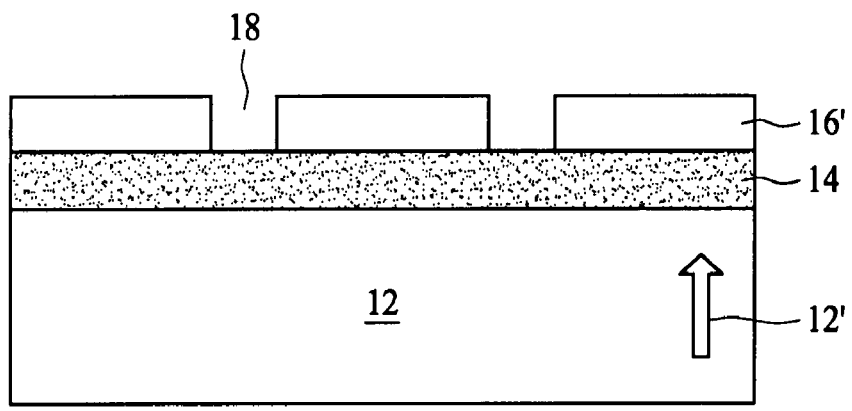

FIG. 1 to FIG. 6 illustrate a method for preparing a periodically poled element 10 according to one embodiment of the present invention. First, a ferroelectric substrate 12 having a top surface 12A and a bottom surface 12B undergoes a deposition process to form an insulating layer 14 on the top surface 12A, and a spin-coating process is performed to form a photoresist layer 16 on the insulating layer 14. The insulating layer 14 may include silicon oxide, silicon nitride, aluminum oxide, photoresist or silicon oil. The ferroelectric substrate 12 has a predetermined polarization direction 12' from the bottom surface 12B to the top surface 12A. Subsequently, a photolithographic process is performed to form a patterned photoresist layer 16' having a plurality of openings 18, as shown in FIG. 2.

Figure 3:
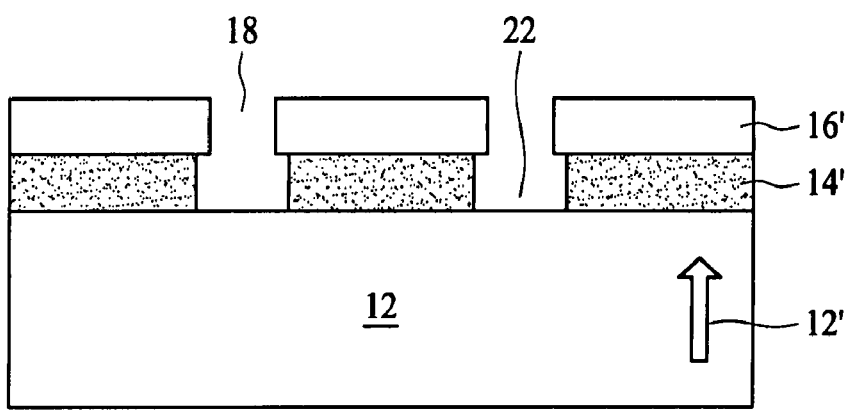
Figure 4:
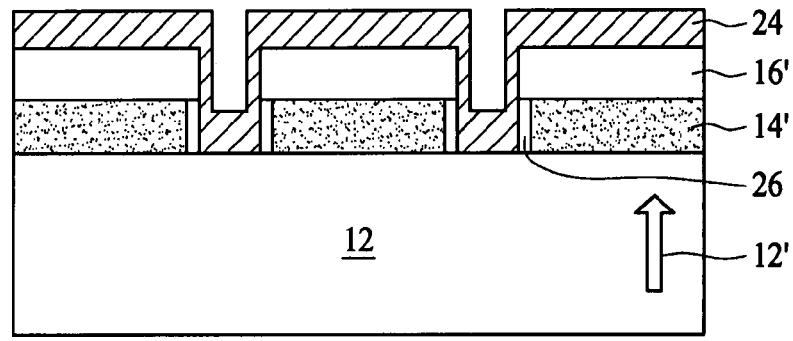

As shown in FIG. 3, an etching process such as a wet etching process or an isotropic dry etching process is performed by using the patterned photoresist layer 16' as an etching mask to remove a portion of the insulating layer 14 under the openings 18 of the patterned photoresist layer 16', so as to form a plurality of insulators 14' positioned on the top surface 12A in a periodical manner and separated by a plurality of openings 22. Subsequently, a metal deposition process is performed to form a metal layer 24 filling a portion of the openings 22 and covering the patterned photoresist layer 16', as shown in FIG. 4. In particular, the wet etching process or an isotropic dry etching process undercuts the insulating layer 14 to form a gap 26 between the metal layer 24 and the insulator 14'.

Figure 5:
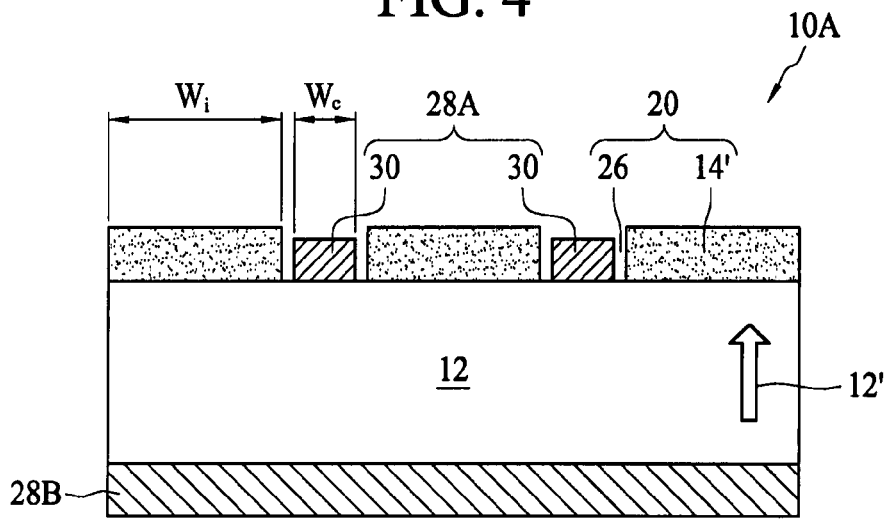

As shown in FIG. 5, after the metal deposition process, a lift-off process is performed to remove a portion of the metal layer 24 above the patterned photoresist layer 16' and on the sidewalls of the patterned photoresist layer 16', and the remaining portion of the metal layer 24 forms a top electrode structure 28A having a plurality of conductors 30 on the top surface 12A in a periodical manner and occupying a portion of the openings 22. Subsequently, another metal deposition process is performed to form a bottom electrode structure 28B on the bottom surface 12B to form a precursor 10A. The insulators 14' and the gap 26 form a suppressing structure 20 isolating the conductors 30 from each other. In particular, the width ($W_i$) of the insulators 14' is greater than the width ($W_c$) of the conductors 30, the gap 26 of the suppressing structure 20 separates the conductors 30 from the insulators 14', and the insulators 14' and the conductors 30 are positioned on the top surface 12A in an interlaced manner.

Figure 6:
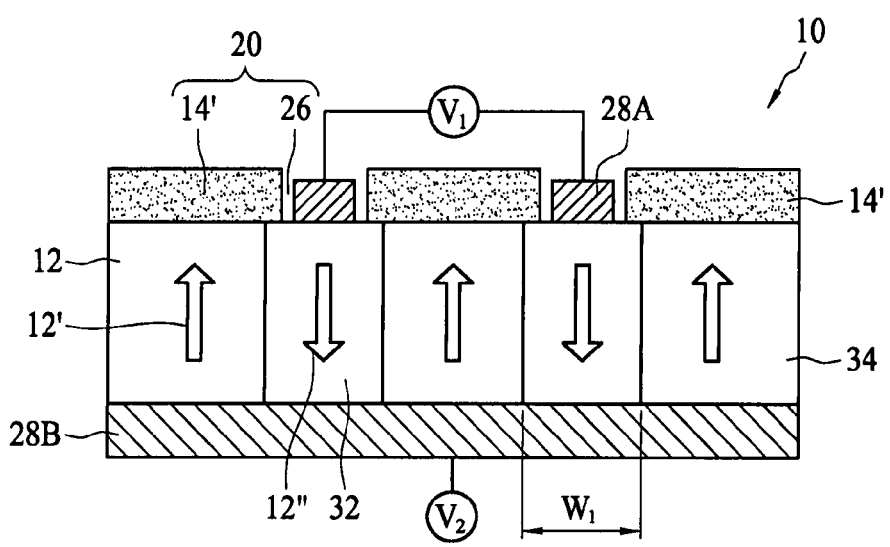

As shown in FIG. 6, the precursor 10A is dipped in an insulation liquid such as silicon oil such that the gap 26 of the suppressing structure 20 is filled with insulation liquid. Subsequently, a poling process is performed by applying a first voltage ($V_1$) to the conductors 30 of the top electrode structure 28A and applying a second voltage ($V_2$) to the bottom electrode structure 28B to complete the periodically poled element 10. The conductors 30 of the top electrode structure 28A are configured to form a plurality of inverted domains 32 with an inverted polarization direction 12" and a predetermined width ($W_1$) in the ferroelectric substrate 12 during the poling process. In particular, the ferroelectric substrate 12 can be considered as consisting of the inverted domains 32 and non-inverted domains 34 interlaced with the inverted domains 32.

Figure 7:
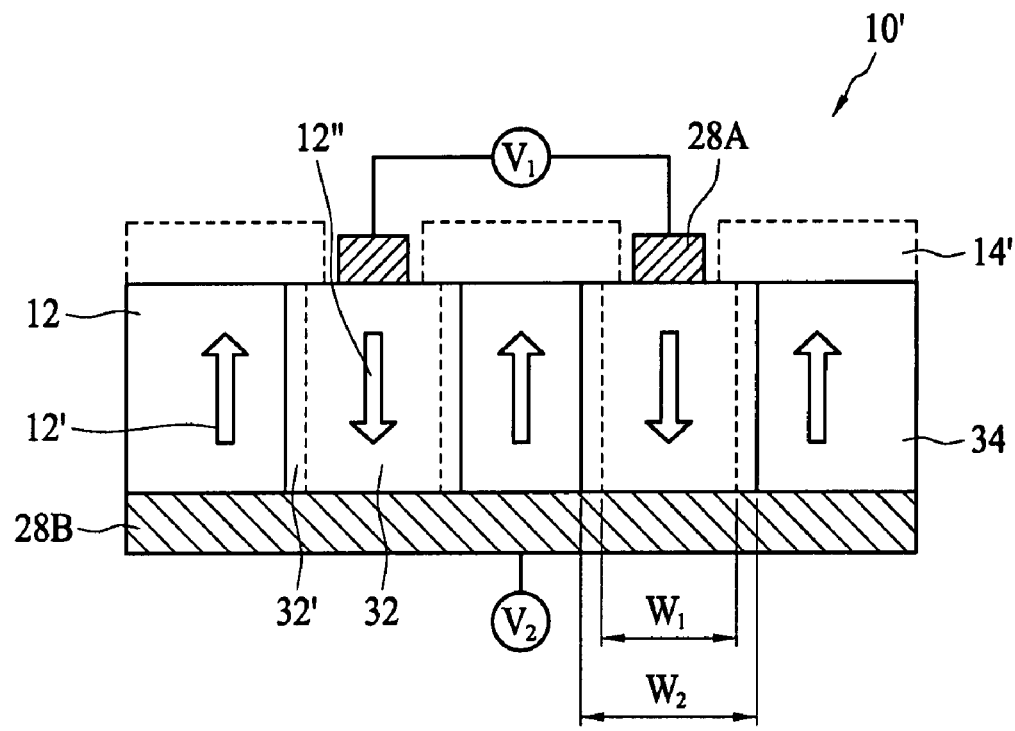
FIG. 7 illustrates a periodically poled element prepared substantially by the same process shown in FIGS. 1-6 except the suppressing structure is not used in the poling process.

FIG. 7 illustrates a periodically poled element 10' prepared substantially by the same process shown in FIGS. 1-6 except the suppressing structure 20 is not used in the poling process. The insulators 14' and the gap 26 of the suppressing structure 20 are configured to suppress the spreading of the inverted domains 32 during the poling process, so the width of the inverted domain 32 is "$W_1$", which can be defined substantially by one insulator 14' and one gap 26 of the suppressing structure 20. In contrast, the width of the inverted domain 32' will extend laterally from "$W_1$" to "$W_2$" if the poling process is performed on a periodically poled element 10' without the suppressing structure 20. In other words, the use of the suppressing structure 20 can inhibit the lateral spreading degree of the inverted domains 32, and therefore the widths of the inverted domains 32 and non-inverted domains 34 are substantially controlled by the width of the suppressing structure 20.

Figure 8:
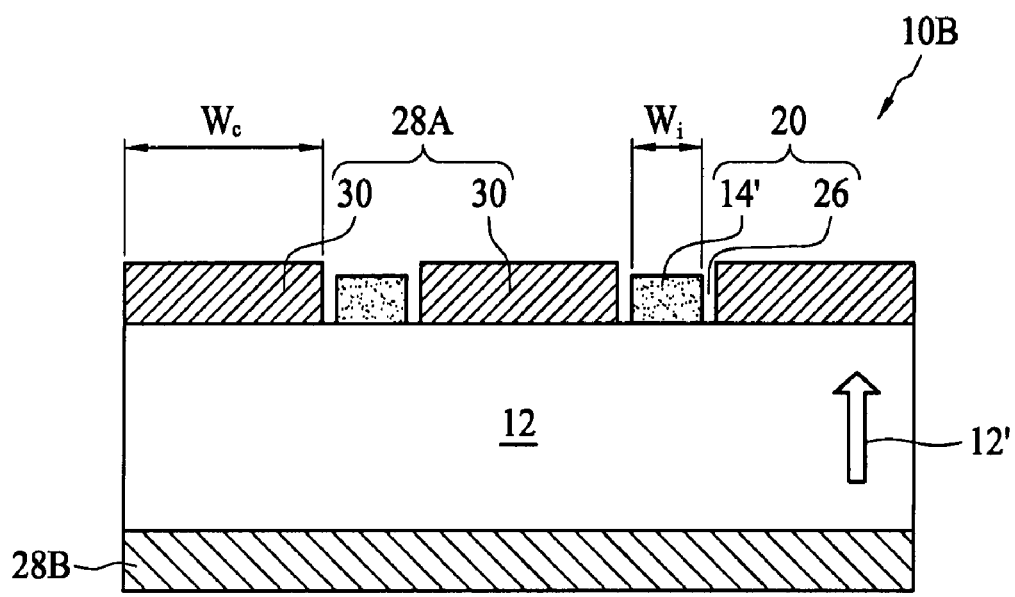
FIG. 8 illustrates a precursor according to another embodiment of the present invention.

FIG. 8 illustrates a precursor 10B according to another embodiment of the present invention. Compared with the precursor 10A having the insulators 14' with the width ($W_i$) greater than the width ($W_c$) of the conductors 30 as shown in FIG. 5, the precursor 10B has the insulators 14' with the width ($W_i$) smaller than the width ($W_c$) of the conductors 30. Optionally, the width of the insulators 14' can also be design to be equal to the width ($W_c$) of the conductors 30. In other words, the present invention also provides a design flexibility for controlling the width of the inverted domain 32' by adjusting the width of the conductors 30 and the width of the suppressing structure 20, and the inverted domains 32 and non-inverted domains 34 can be designed to be different by adjusting the width of the suppressing structure 20.

Figure 9:
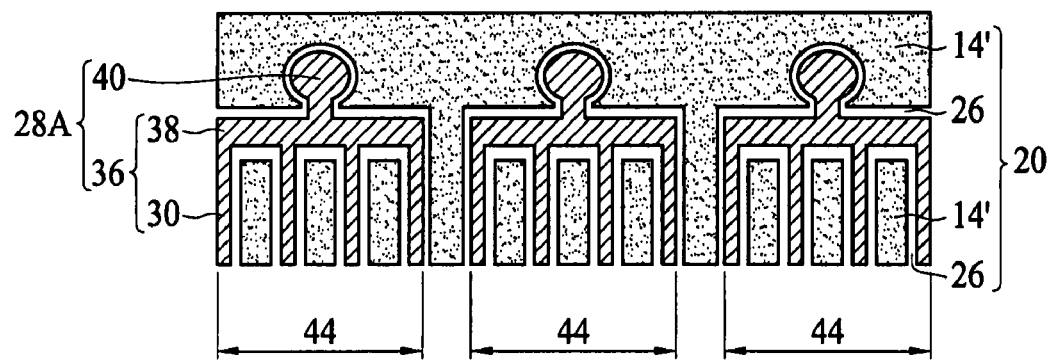
FIG. 9 is a top view of the periodically poled element according to a first embodiment of the present invention.

FIG. 9 is a top view of the periodically poled element 10 according to a first embodiment of the present invention. The top electrode structure 28A includes a plurality of electrode subsets 44 arranged in a periodical manner. For example, the electrode subsets 44 are comb-shaped blocks 36 each including a body 38 and a plurality of conductors 30 connected to the body 38. The top electrode structure 28A also includes a voltage-applying pad 40 connected to the body 36 of the comb-shaped block 36, and the conductors 30 of the top electrode structure 28A are isolated from the insulators 14' of the suppressing structure 20 by the gap 26. In particular, a large poling area can be segmented into several sub-areas by using the electrode subsets 44.

Figure 10:
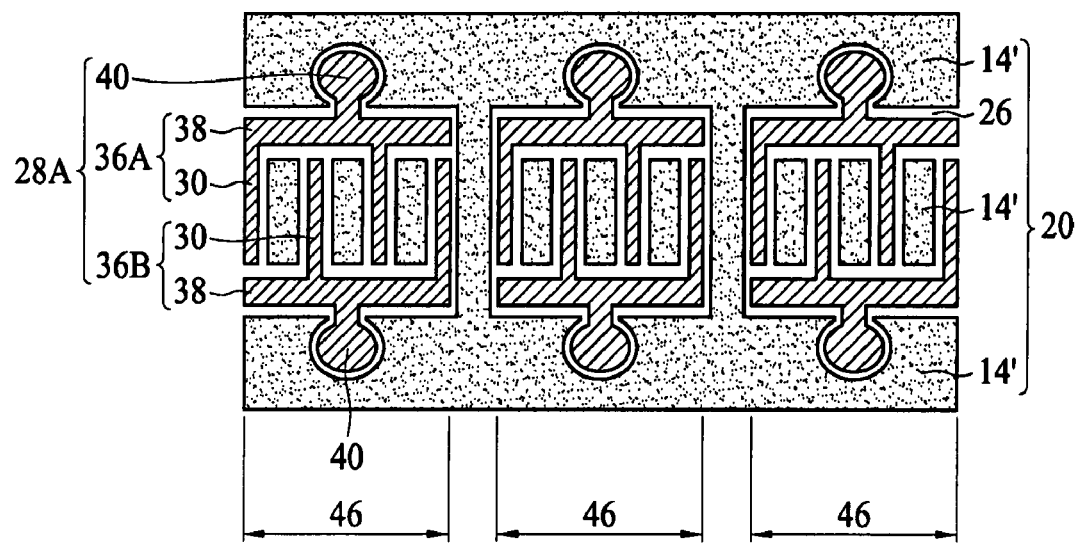
FIG. 10 is a top view of the periodically poled element according to a second embodiment of the present invention.

FIG. 10 is a top view of the periodically poled element 10 according to a second embodiment of the present invention. The top electrode structure 28A includes a plurality of electrode subsets 46 arranged in a periodical manner. For example, the electrode subsets 46 include a first comb-shaped block 36A and a second comb-shaped block 36B arranged in an interlaced manner. The first comb-shaped block 36A and the second comb-shaped block 36B each includes a body 38 and a plurality of conductors 30 connected to the body 38. The top electrode structure 28A also includes a plurality of voltage-applying pads 40 connected to the bodies 40 of the first comb-shaped block 36A and the second comb-shaped block 36B. In particular, the conductors 30 of the top electrode structure 28A are isolated from the insulators 14' of the suppressing structure 20 by the gap 26.

Figure 11:
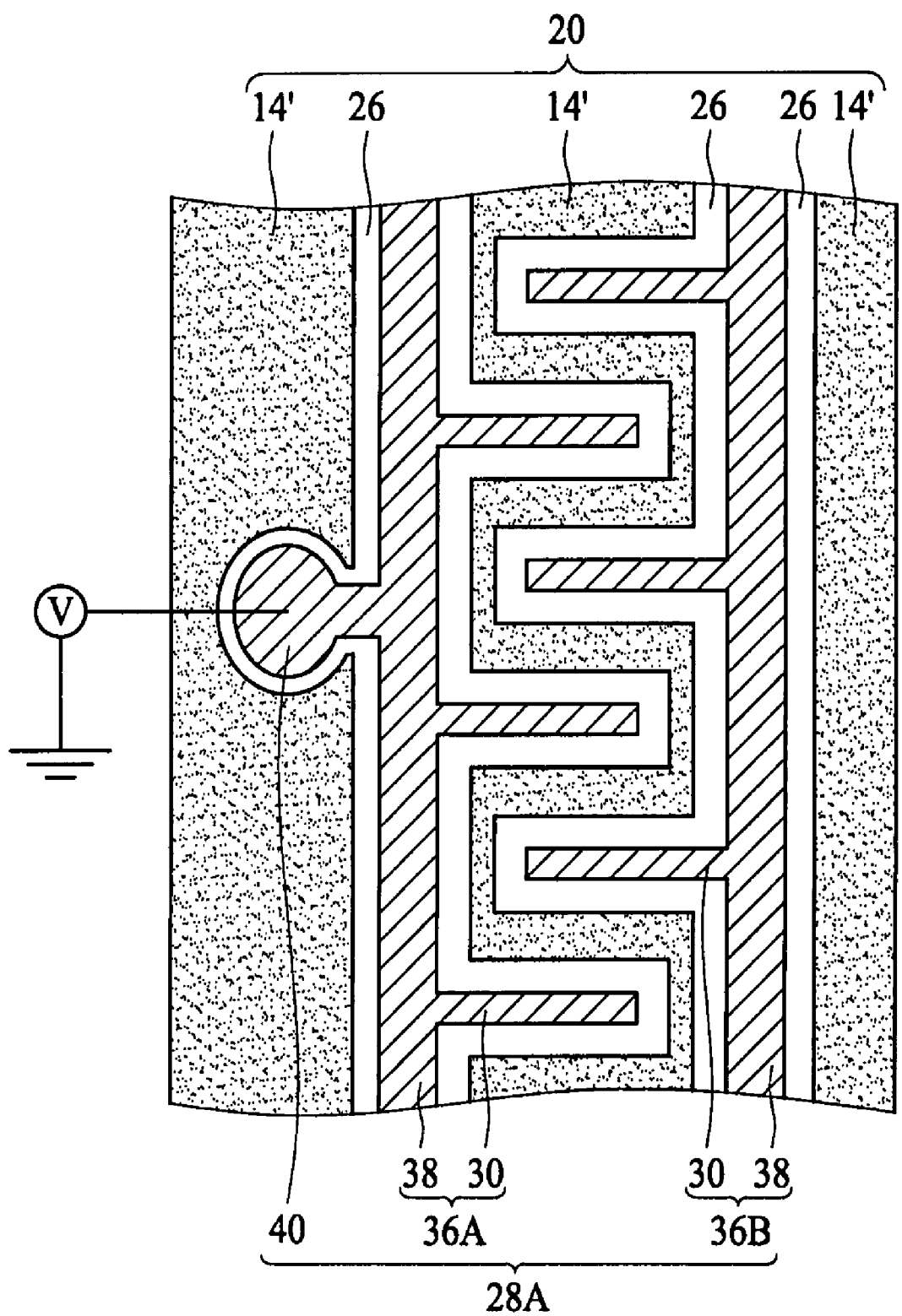
FIG. 11 is a top view of the periodically poled element according to a third embodiment of the present invention.

FIG. 11 is a top view of the periodically poled element 10 according to a third embodiment of the present invention. The top electrode structure 28A includes a first comb-shaped block 36A and a second comb-shaped block 36B arranged in an interlaced manner. The first comb-shaped block 36A and the second comb-shaped block 36B each includes a body 38 and a plurality of conductors 30 connected to the body 38. The top electrode structure 28A also includes a voltage-applying pad 40 connected to the body 38 of the first comb-shaped block 36A. In particular, the conductors 30 of the top electrode structure 28A are isolated from the insulators 14' of the suppressing structure 20 by the gap 26. During the poling process, the first voltage ($V_1$) is applied to the first comb-shaped block 36A via the voltage-applying pad 40, while the second comb-shaped block 36B is floated.

Figure 12:
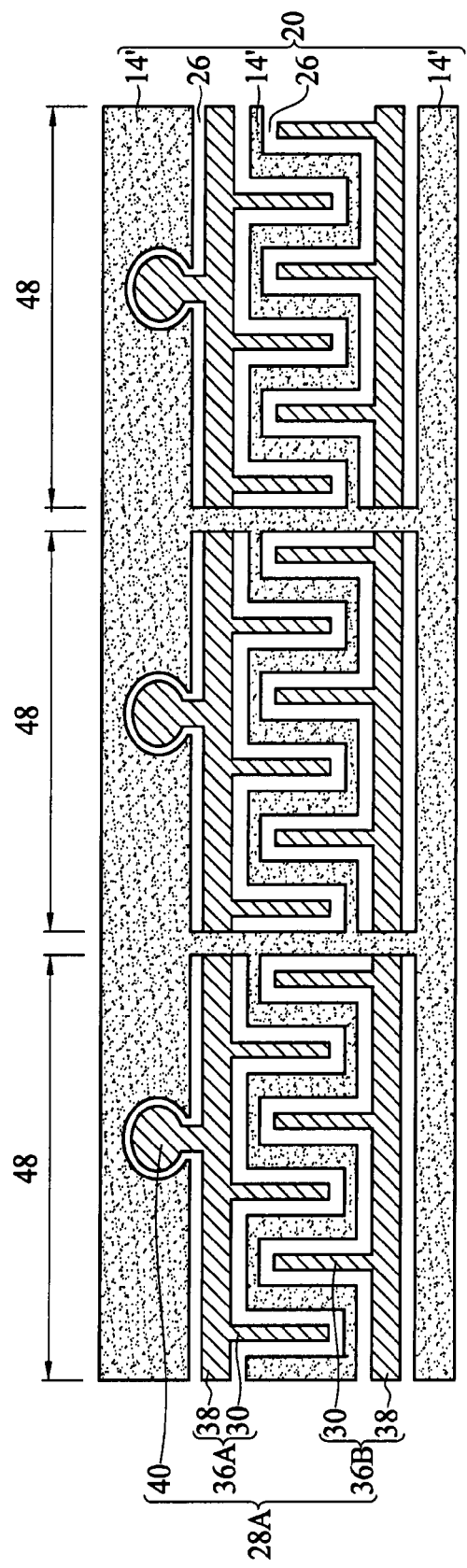
FIG. 12 is a top view of the periodically poled element according to a fourth embodiment of the present invention.

FIG. 12 is a top view of the periodically poled element 10 according to a fourth embodiment of the present invention. The top electrode structure 28A includes a plurality of electrode subsets 48 arranged in a periodical manner. For example, the electrode subsets 48 include a first comb-shaped block 36A and a second comb-shaped block 36B arranged in an interlaced manner. The first comb-shaped block 36A and the second comb-shaped block 36B each includes a body 38 and a plurality of conductors 30 connected to the body 38. The top electrode structure 28A also includes a voltage-applying pad 40 connected to the body 36A of the first comb-shaped block 36A. In particular, the conductors 30 of the top electrode structure 28A are isolated from the insulators 14' of the suppressing structure 20 by the gap 26. During the poling process, the first voltage ($V_1$) is applied to the comb-shaped block 36A via the voltage-applying pad 40, while the comb-shaped block 36B is floated.

Figure 13:
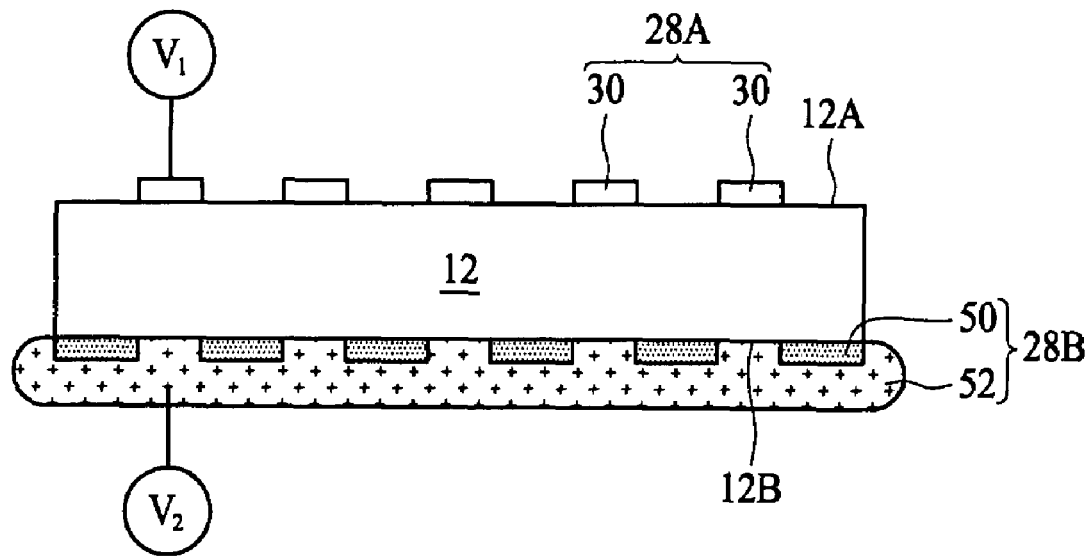
FIG. 13 illustrates a bottom electrode structure according to one embodiment of the present invention.

FIG. 13 illustrates a bottom electrode structure 28B according to one embodiment of the present invention. The bottom electrode structure 28B includes a plurality of insulators 50 positioned on the bottom surface 12B and a conductor 52 such as conductive liquid or metal. To perform the poling process, the first voltage ($V_1$) is applied to the top electrode structure 28A on the top surface 12A, and the second voltage ($V_2$) is applied to the conductor 52 of the bottom electrode structure 28B.

Figure 14:
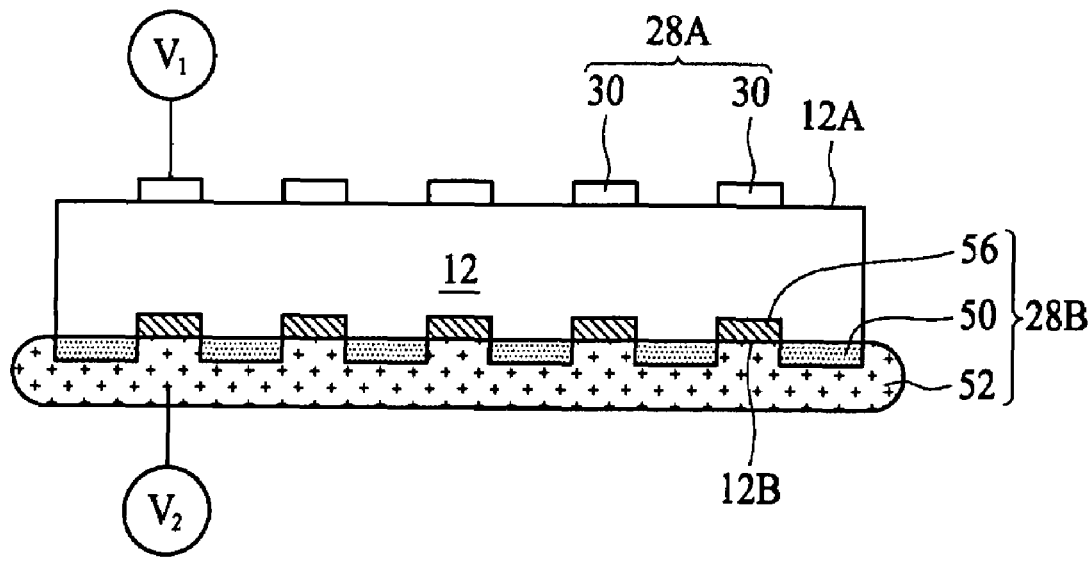
FIG. 14 illustrates a bottom electrode structure according to another embodiment of the present invention.

FIG. 14 illustrates a bottom electrode structure 28B according to another embodiment of the present invention. The bottom electrode structure 28B includes a plurality of conductive regions 56 such as the proton-exchange region in the bottom portion of the ferroelectric substrate 12, a plurality of insulators 50 positioned on the second surface 12B and a conductor 52 such as conductive liquid or metal. To perform the poling process, the first voltage ($V_1$) is applied to the first electrode structure 28A on the first surface 12A, and the second voltage ($V_2$) is applied to the conductor 52 of the bottom electrode structure 28B.

In addition, the bottom electrode structure 28B on the second surface 12B of the ferroelectric substrate 12 can be a variety of conductors, as shown in U.S. patent application Ser. Nos. 11/619,021, 11/465,681, 11/557,907, and 11/861,874. These applications are incorporated herein by reference.

The above-described embodiments of the present invention are intended to be illustrative only. Numerous alternative embodiments may be devised by those skilled in the art without departing from the scope of the following claims.

What is claimed is:

1. A periodically poled element, comprising:
   a ferroelectric substrate with a predetermined polarization direction, and having a top surface and a bottom surface;
   a top electrode structure including at least one conductor positioned on the top surface, and the conductor being configured to form an inverted domain with an inverted polarization direction in the ferroelectric substrate as a predetermined voltage is applied to the top electrode structure; and
   a suppressing structure including at least one insulator positioned on the top surface and a gap separating the insulator from the conductor, and configured to suppress the spreading of the inverted domain.

2. The periodically poled element of claim 1, wherein the width of the insulator is greater than the width of the conductor.

3. The periodically poled element of claim 1, wherein the width of the insulator is smaller than the width of the conductor.

4. The periodically poled element of claim 1, wherein the width of the insulator is equal to the width of the conductor.

5. The periodically poled element of claim 1, wherein the suppressing structure including a plurality of insulators positioned on the top surface in a periodical manner.

6. The periodically poled element of claim 1, wherein the top electrode structure including a plurality of conductors positioned on the top surface in a periodical manner.

7. The periodically poled element of claim 1, wherein the suppressing structure includes a plurality of insulators, the top electrode structure includes a plurality of conductors, and the insulators and the conductors are positioned on the top surface in an interlaced manner.

8. The periodically poled element of claim 1, wherein the suppressing structure includes silicon oxide, silicon nitride, aluminum oxide, photoresist or silicon oil.

9. The periodically poled element of claim 1, wherein the top electrode structure includes at least one comb-shaped block including a body and a plurality of conductor connected to the body.

10. The periodically poled element of claim 9, wherein the comb-shaped block further includes a voltage-applying pads connected to the body.

11. The periodically poled element of claim 1, wherein the top electrode structure includes a first comb-shaped block, and a second comb-shaped block interlaced with the first comb-shaped block.

12. The periodically poled element of claim 11, wherein the top electrode structure further includes a voltage-applying pad connected to the first comb-shaped block.

13. The periodically poled element of claim 1, wherein the top electrode structure includes a plurality of electrode subsets arranged in a periodical manner.

14. The periodically poled element of claim 13, wherein the electrode subsets are comb-shaped block.

15. The periodically poled element of claim 14, wherein the top electrode structure further includes a voltage-applying pad connected to the comb-shaped block.

16. The periodically poled element of claim 13, wherein each electrode subset includes a first comb-shaped block and a second comb-shaped block interlaced with the first comb-shaped block.

17. The periodically poled element of claim 16, wherein the top electrode structure further includes a voltage-applying pad connected to the first comb-shaped block.

18. The periodically poled element of claim 1, further comprising a bottom electrode structure positioned on the bottom surface.

* * * * *